United States Patent [19]
Tsinker

[11] Patent Number: 6,104,236
[45] Date of Patent: Aug. 15, 2000

[54] APPARATUS AND METHOD FOR EQUALIZING RECEIVED NETWORK SIGNALS USING A TRANSCONDUCTANCE CONTROLLED BIQUADRATIC EQUALIZER

[75] Inventor: Vadim Tsinker, Belmont, Calif.

[73] Assignee: Advanced Micro Devices, Inc., Sunnyvale, Calif.

[21] Appl. No.: 09/170,427

[22] Filed: Oct. 13, 1998

Related U.S. Application Data

[60] Provisional application No. 60/082,183, Apr. 17, 1998.

[51] Int. Cl.$^7$ ...................................................... H04B 1/10
[52] U.S. Cl. .......................... 327/557; 327/336; 330/302; 375/229
[58] Field of Search ..................................... 327/551–559, 327/560, 563, 336, 337; 330/302–306, 252; 375/229, 230, 235

[56] References Cited

U.S. PATENT DOCUMENTS

| | | | |
|---|---|---|---|
| 4,839,542 | 6/1989 | Robinson | 327/558 |
| 5,227,681 | 7/1993 | Koyama et al. | 327/65 |
| 5,559,470 | 9/1996 | Laber et al. | 330/252 |

*Primary Examiner*—Timothy P. Callahan
*Assistant Examiner*—Minh Nguyen

[57] ABSTRACT

A network line equalizer includes a transconductance-controlled, tunable single zero high pass filter having a parasitic pole, and a single zero, single pole low pass filter, that eliminates the necessity of feedback loops or operational amplifiers. The tunable single zero high-pass filter includes a single zero impedance circuit, and first and second MOS transistors that output differential currents based on differential input signals and the impedance of the single zero impedance circuit. The MOS transistors act as source followers to convert the differential input voltage signals to respective differential current signals. The single zero impedance circuit connects the first and second MOS transistors, and causes the first and second MOS transistors to output a filtered pair of differential signals based on the impedance. The impedance of the single zero impedance circuit is implemented using CMOS transistors, enabling the impedance to be dynamically controlled by an external impedance controller. The single zero, single pole low pass filter includes first MOS transistors each having a first size (S1) and a gate for receiving the corresponding filtered differential voltage signal and in response outputting a first current signal. Low pass filters composed of MOS transistors output filtered voltage signals, and a set of second MOS transistors convert the filtered voltage signals to second current signals. The second MOS transistors have a size (S2) relative to the first size (S1) such that $S2=S1(z-p)/p$, where z is the zero and p is the pole of the low pass-filter.

25 Claims, 10 Drawing Sheets

APPARATUS AND METHOD FOR EQUALIZING RECEIVED NETWORK SIGNALS USING A TRANSCONDUCTANCE CONTROLLED BIQUADRATIC EQUALIZER

CROSS REFERENCE TO RELATED APPLICATIONS

This application claims priority from Provisional Application No. 60/082,183, filed Apr. 17, 1998, entitled "Quad Fast Ethernet Transceiver for 10 BASE-T/100 BASE-X (QFEX 10/100)."

BACKGROUND OF THE INVENTION

1. Technical Field

The present invention relates to network line equalizers having filters for equalizing attenuated transmitted analog signals, such as multiple layer transition (MLT-3) decoded signals, from a network medium such as a 100-BASE-TX Ethernet (IEEE standard 802.3u) transmission medium.

2. Background Art

Local area networks use a network use a network cable or other network media to link nodes (e.g., workstations, routers and switches) to the network. Each local area network architecture uses a media access control (MAC) enabling a network interface device at each network node to share access to the media.

Physical (PHY) layer devices are configured for translating digital packet data received from a MAC across standardized interface, e.g., a media independent interface (MII), into-an analog signal for transmission on the network medium, and reception of analog signal transmitted from a remote node via the network medium. An example is the 100 BASE-TX IEEE standard 802.3u receiver, configured for receiving a 3-level MLT-3 encoded analog signal at a 125 Mb/s data rate.

One problem with transmission of analog signals on the network medium is the attenuation of high-frequency components. For example, FIG. 1A is a diagram illustrating simplified frequency response characteristics f(line) of the network medium. As shown in FIG. 1A, an MLT-3 encoded signal transmitted by the network medium encounters transmission loss in the form of high-frequency attenuation. Hence, the 100-BASE-TX Ethernet (IEEE 802.3u) receiver includes a line equalizer having a high-pass filter, having the frequency response (f(filter)) of FIG. 1B to compensate for the high-frequency attenuation from the network medium. One example of a high-pass filter is a single zero filter.

FIG. 2 is a diagram illustrating a conventional single zero high-pass filter 10. As shown in FIG. 2, the high-pass filter 10 includes an operational amplifier 12, a capacitor 14 having capacitance C., a resister 16 having resistance R. As recognized in the art, the high-pass filter 10 has a transfer function $H(s)=S+Z$, where Z equals $1/RC$. Hence, the high-pass circuit 10 is considered a single zero filter, where S is a complex variable based on frequency.

A disadvantage of the high pass filter 10 is that a high bandwidth operational amplifier 12 is required for implementation. In addition, a direct connection of the high-pass filter 10 within a line equalizer may affect the impedance of the transmission line (i.e., the network medium), since the capacitor 14 and resistor 16 are in parallel with the transmission line's termination resistance. In addition, the connection of the capacitor 14 is between the two nodes ($V_{IN}$ and $V_O$), neither of which is a ground or a supply node. Hence, the high-pass filter 10 is extremely difficult to implement using CMOS technology, since a CMOS capacitor cannot be connected between two arbitrary nodes.

A single zero equalizer may not always provide the optimum compensation for the line response f(line). For example, FIG. 3 is a diagram illustrating an alternate characterization of the frequency response characteristics f'(line) of the network medium. As shown in FIG. 3, the frequency response f' includes a linear region 10 between points C and D, and a nonlinear lower frequency region 18 between points A and B. Although a single zero equalizer may compensate adequately in the linear region 10, the single zero equalizer may not compensate as well within the range 18 within the lower range of frequencies. Hence, some other function is needed to compensate for the attenuation in the transmission medium according to the function f(line). More precise compensation can be obtained over a single zero filter with the addition of the single zero, single pole filter.

A single, single pole filter operates according to the transfer function $H=(s+z)/(s+p)$, where z is a zero and p is a pole located higher than zero in the frequency range. Single zero, single pole filters are typically implemented using an operational amplifier or a switched capacitor filter, which significantly increases the complexity of the design.

More precise filtering of received network signal may be performed using an equalizer having filters operating according to biquadratic functions, for example $H=(S+Z1)(S+Z2)/(S+P1)(S+P_2)$. The function "H" is described as a biquadratic function, since the numerator and denominator consist of quadratic equations. Biquadratic equalizers are typically implemented using either a single operational amplifier and a significant number of passive components, or several transconductance amplifiers in a feedback loop, as shown in FIG. 4. Use of a large number of passive components is discouraged in CMOS design, due to the large area, poor parameter control, and unavailability. Feedback loops, however, introduce stability problems that need to be simulated carefully to insure that the circuit is stable throughout the entire frequency range.

SUMMARY OF THE INVENTION

There is a need for an arrangement that enables a biquadratic equalizer to be implemented using CMOS technology with minimal effort.

There is also a need for an arrangement that enables a biquadratic equalizer to be implemented without the necessity of an operational amplifier or a switched capacitor filter.

There is also a need for an arrangement for providing a biquadratic equalizer using MOS transistors that enables the equalizer to be tuned in response to an external control signal.

These and other needs are obtained by the present invention, where a biquadric equalizer includes a first filter composed of MOS transistors and a second filter composed of MOS transistors and cascaded with the first filter to provide a higher order filter free of feedback loops or passive components. The first filter includes MOS transistors for receiving a corresponding differential input signal, and a single zero impedance circuit connecting the MOS transistors and causing the MOS transistors to generate differential filtered signals based on the single zero impedance, and a parasitic pole in the MOS transistors. The second filter includes MOS transistors having selected sizes based on a prescribed relation between a pole and a zero of the second filter to provide a single zero, single pole filter.

According to one aspect of the present invention, a biquadratic equalizer includes a first filter and a single zero, single pole filter. The first filter includes first and second MOS transistors, each having first and second junctions and a gate for receiving a corresponding differential input signal. The first filter also includes a single zero impedance circuit connecting the first and second MOS transistors at the corresponding first junctions. The second junctions of the first and second MOS transistors output respective differential filtered signals based on the impedance, the differential input signals, and a parasitic pole caused by the first and second MOS transistors. The single zero, single pole filter includes third and fourth MOS transistors, each having a gate for receiving a corresponding differential filtered signal, for outputting first and second current signals, respectively. The single zero, single pole filter also includes first and second low pass filters, each having a pole defined by a prescribed resistance and capacitance, for outputting first and second filtered signals based on the pole and in response to the first and second current signals, respectively. The single zero, single pole filter also includes fifth and sixth MOS transistors having gates for receiving the first and second filtered signals and in response outputting the third and fourth current signals, respectively. The first, second, third and fourth current signals are combined to provide a differential output signal equalized in accordance with a prescribed biquadratic function.

Use of the MOS transistors for receiving the input signal provides an infinite DC impedance to the input terminals, significantly reducing signal attenuation at the inputs. Moreover, the MOS transistors provide a high speed operation due to the direct and simple conversion of input voltage to operating current, ensuring that the transfer function of the filter is not affected by parasitic poles at higher frequency ranges.

An additional feature of this aspect of the present invention is that the low pass filters are implemented using a MOS transistor providing the prescribed resistance, and a MOS transistor providing the prescribed capacitance. Hence, the filters areasily tunable by changing the size of the MOS transistor providing the prescribed resistance, or by adjusting the gate voltage using a control signal. The MOS gate capacitance can also be used as at least part of the capacitance element of the low pass filter, advantageous for CMOS processes where the capacitance element with arbitrary node connection is not available, as opposed to node-to-ground or node-to-$V_{CC}$ only. Hence, relatively complex filters can be easily implemented in relatively small sizes.

Another aspect of the present invention provides a method of equalizing an input signal. The method includes filtering an input voltage signal in a high-pass filter, having transconductance-controlled MOS transistors generating a single zero and parasitic pole, and outputting a filtered input voltage signal. A first current signal is output from a first MOS transistor in response to receiving the filtered input voltage signal at a corresponding gate, where the first MOS transistor has a first size. A filtered voltage signal is output from a low pass filter in response to receiving the filtered input voltage signal, where the low pass filter has a pole defined by a prescribed resistance and a prescribed capacitance. A second current signal is output from a second MOS transistor in response to receiving the filtered voltage signal, where the second MOS transistor has a second size relative to the first size by a prescribed relation by a pole and a transfer function zero. The first and second current signals are combined to form a filtered signal.

Additional advantages and novel features of the invention will be set forth in part in the description which follows, and in part may become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 5:
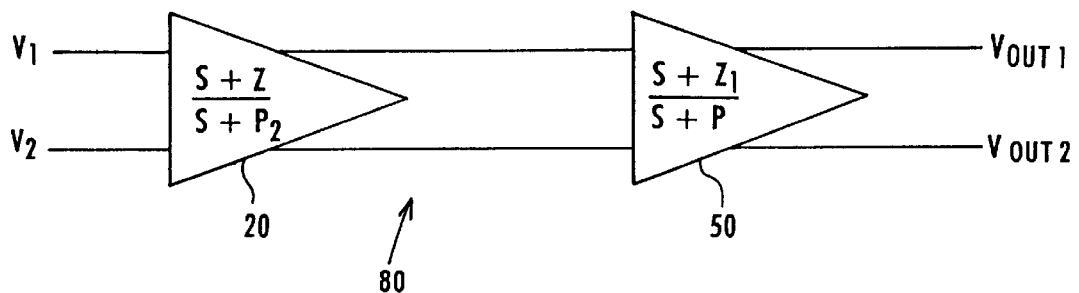
FIG. 5 is a block diagram summarizing the zero-feedback biquadratic equalizer according to an embodiment of the present invention.

FIG. 5 is a diagram illustrating a biquadratic equalizer 80 formed of a single zero filter 20 having a parasitic pole, and a single zero, single pole high pass filter 50 according to an embodiment of the present invention. As described in detail below, the filters 20 and 50 can be implemented using relatively simple components without the necessity of feedback loops. Hence, the equalizer 80 has a relatively small size. The elimination of feedback loops eliminates any stability issues that are normally encountered in feedback based systems. In particular, feedback amplifier systems suffer from oscillation and ringing at certain frequencies, requiring efforts to insure amplifier stability. Use of filters 20 and 50 in series, however, eliminates the necessity of a feedback loop, substantially improving stability.

As described below, the overall transfer function of the equalizer 80 is $H=H_A H_B=(S+Z)(S+Z1)/(S+P_2)(S+P)$, where "$P_2$" is a parasitic pole defined by the size of MOS transistors in the filter 20, described below. The effect of the pole $P_2$ may be reduced by increasing the size of the MOS transistors, thus moving the pole into a higher frequency range.

As described below, the equalizer 80 provides a single input voltage to operating current conversion, forcing parasitic poles into a very high frequency range, minimizing the adverse effects on the overall equalizer function. Moreover, all tranconductance and capacitive elements can be produced from simple MOS devices in accordance with existing CMOS processes. Moreover, this circuit 80 has no feedback loops, resulting in guaranteed stability.

A description will first be provided of the single zero filter 20, following by a discussion of the single zero, single pole filter 50.

Figure 6A:
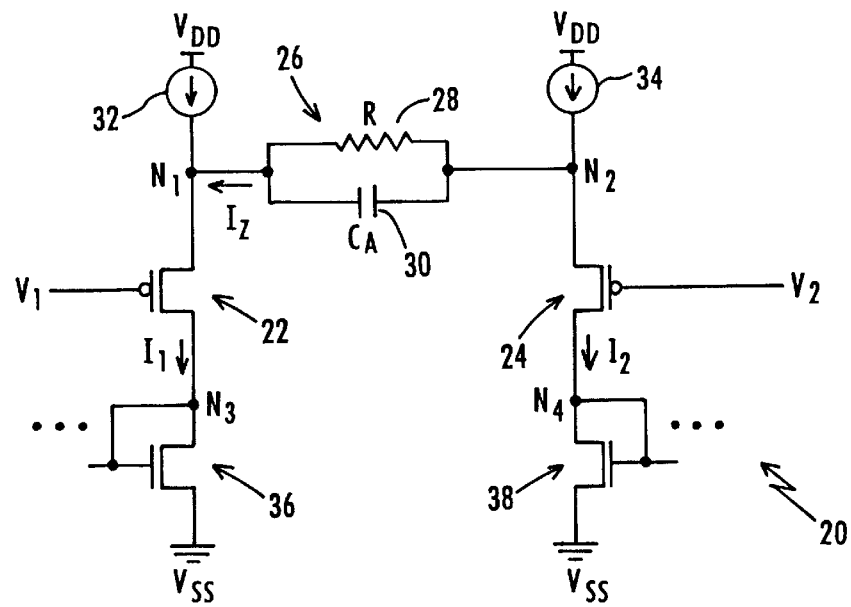
FIGS. 6A and 6B are diagrams illustrating alternative implementations of the single zero filter of FIG. 5 according to an embodiment of the present invention.

FIG. 6A is a simplified circuit diagram illustrating a single zero high pass filter 20 according to an embodiment of the present invention. The single zero high-pass filter 20 is a transconductance (GmC)-type filter. According to the disclosed embodiment, a high-pass filter 20 includes metal oxide semiconductor (MOS) transistors 22 and 24 that act as source followers to convert differential input signals $V_1$ and $V_2$ into respective currents $I_1$ and $I_2$. The single zero high-pass filter 20 also includes a single zero impedance circuit 26, having a resistor 28 (R) connected in parallel with a capacitor 30 ($C_A$). The single zero impedance circuit 26 connects the first and second MOS transistors 22 and 24 at the corresponding first junctions $N_1$, and $N_2$. As described below, the single zero impedance circuit 26 outputs a current $I_z$ that corresponds to the difference between the differential input signals $V_2-V_1$ and the impedance (Z) of the single zero impedance circuit 26. Ideally, the input differential voltage ($V_1-V_2$,) is identical to the voltage between nodes $N_1$, and $N_2$. Hence, the voltage drop across the gates of MOS transistors 22 and 24 are substantially equal, such that $V_1-V_2$ equals $N_1-N_2$.

Hence, the current $I_z$ flowing through the single zero impedance circuit 26 is $I_z=(V_1-V_2)C_A(S+1/RC_A)$. The single zero high-pass filter 20 also includes a first current source 32 and a second current source 34 for supplying a bias current ($V_B$) to nodes $N_1$ and $N_2$. Hence the total current ($I_1$) output from the MOS transistor 22 equals $I_1=I_B+I_z$, and the current ($I_2$) output from the MOS transistor 24 equals $I_2=I_B-I_z$. Hence the second junctions of the first and second MOS transistors, (i.e., nodes $N_3$ and $N_4$) output respective differential currents $I_{12}$ and $I_2$ having a difference such that $I_1-I_2=I_z$.

Hence, the differential current between nodes $N_3$ and $N_4$ is $2*I_z$, where $I_z$ equals $(V_1-V_2)/Z$, and where Z is the impedance formed by the parallel combination of resistor 28 and capacitor 30 in parallel. The value of Z is $Z=1/C_A*(1/(S+1/RC_A))$. Therefore $1/Z=C_A*(S+1/RC_A)$. According to the disclosed embodiment, the single zero has a frequency of about 18 MHz enabling recovery of high frequency components of 125 MHz from the network.

The particular advantage of this single zero high-pass filter 20 is that the MOS transistors 22 and 24 can be connected to current mirror transistors 36 and 38, configured for repeating the differential current from the MOS transistors 22 and 24, respectively.

While the above-described definition (1/Z) is ideal, the actual circuit 20 will add a high frequency pole ($P_2$) to the above 1/Z equation. This pole is due to the presence of MOS devices 22 and 24. Increasing the size of the MOS transistors 22 and 24 will move the pole to a sufficiently high frequency such that the lower frequency zero is not significantly affected. Hence, the circuit 20 is preferably implemented as having a pole at a frequency substantially greater than 100 Megahertz. Conversely, the effect of the pole $P_2$ can be increased by reducing the size of the MOS transistors 22 and 24, moving the pole $P_2$ to a lower frequency.

Figure 6B:
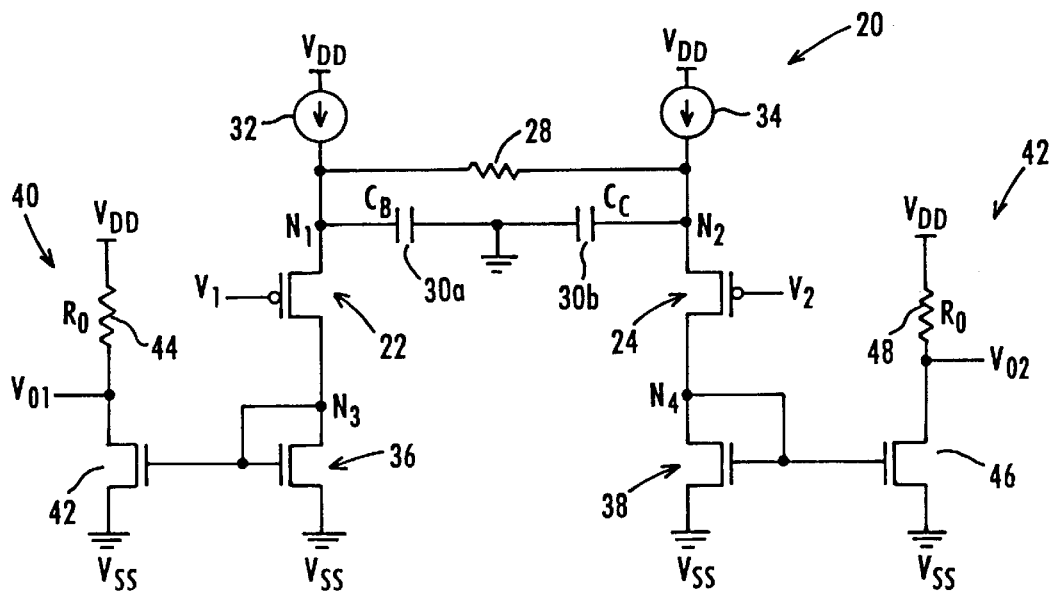

FIG. 6B is a diagram illustrating in further detail the single zero high-pass filter of FIG. 6A. As shown in FIG. 6B, transistors 36 and 38 are used to bias a first MOS transistor circuit 40 and a second MOS transistor circuit 42, respectively. As recognized in the art, the current repeater circuit 40 includes MOS transistor 42 and resistor 44 having resistance $R_0$ for outputting the output voltage $V_{01}$, and the current repeater circuit 42 includes a MOS transistor 46 and resistor 48 having resistance $R_0$ for outputting the voltage $V_{02}$. Hence, the current outputs $I_1$ and $I_2$ are dropped across resistance producing devices 44 and 48, such that the final transfer function of the equalizer 20 in voltage mode becomes $H_A=(V_{02}-V_{01})/(V_2-V_1)=R_0C(S+1/RC_A)$.

Hence, the high-pass filter 20 can be implemented in current mode or voltage mode, where the current on the MOS transistors 36 and 38 are configured as current repeaters for repeating the differential current across subsequent transistors. The high-pass filter 20 may also be implemented in voltage mode where resistors $R_{02}$ are used to generate output voltages $V_{01}$ and $V_{02}$.

Figure 1A:
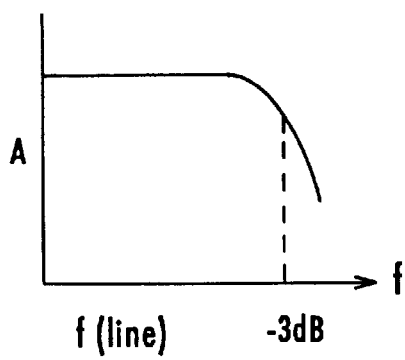
FIGS. 1A and 1B are diagrams illustrating simplified frequency response characteristics of a network medium and a single zero line equalizer, respectively.
Figure 1B:
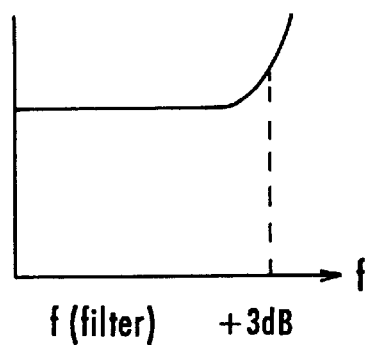
Figure 2:
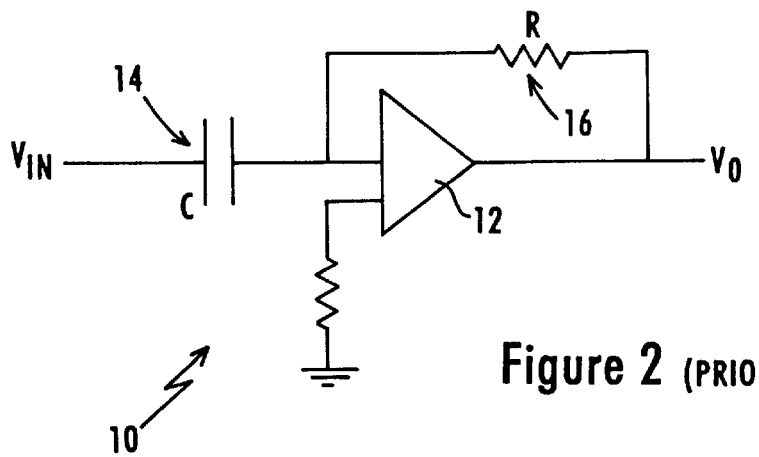
FIG. 2 is a diagram illustrating a prior art signal zero high pass filter.
Figure 3:
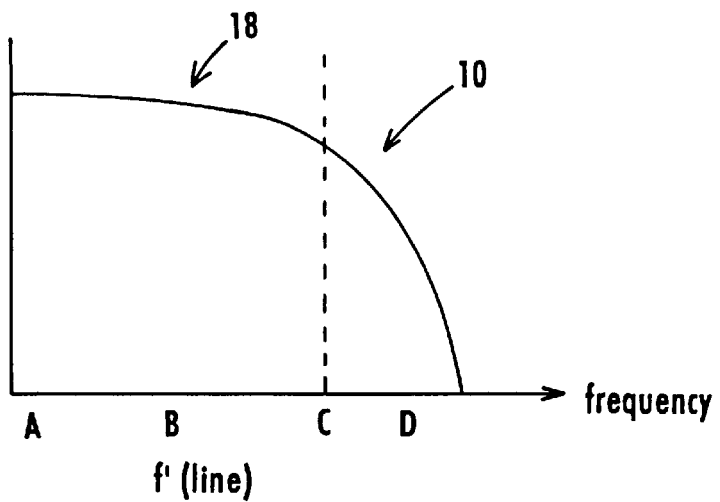
FIG. 3 is a diagram illustrating higher-order frequency response characteristics of a network medium.
Figure 4:
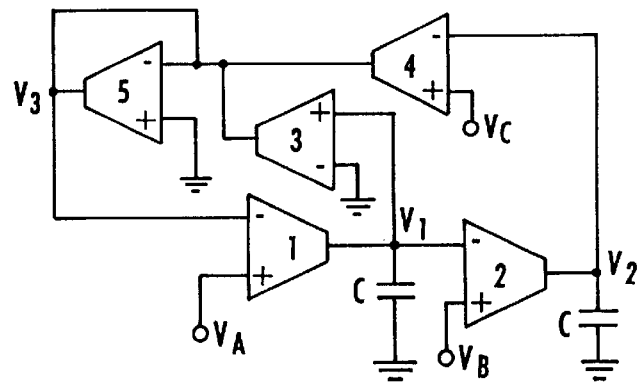
FIG. 4 is a block diagram illustrating a conventional implementation of a biquadratic equalizer.

A particular advantage of the disclosed embodiment is that the capacitor 30 ($C_A$) of FIG. 3 may be implemented using two capacitors 30a and 30b having capacitances $C_B$ and $C_C$, respectively. Hence, MOS devices can be used to implement the capacitances $C_B$ and $C_C$, since each MOS device 30a and 30b has one end connected to ground, and another end connected to a corresponding node.

Another particular advantage of the disclosed embodiment is that the circuits of FIGS. 6A and 6B can be implemented as CMOS devices. For example, MOS transistors 22 and 24 are PMOS transistors, and transistors 36, 38, 42 and 46 are NMOS transistors. Hence, the MOS transistors 22 and 24 provide infinite DC impedance to the network media providing the differential input signals $V_1$ and $V_2$, thus significantly reducing the signal attenuation at equalizer inputs. In addition, the high-pass filter 20 provides high speed operation due to a direct and simple conversion of the input voltages ($V_1$ and $V_2$) into operating currents ($I_1$ and $I_2$) since the MOS transistors 22 and 24 act as source followers. Hence, the equalizer bandwidth is greatly increased since there are at most two conversions, namely voltage-to-current, and current-to-output voltage. Hence, the elimination of a feedback loop optimizes the equalizer speed and eliminates any problems associated with feedback stability.

Another advantage is that the resistance values R of resistor 28 and $R_0$ of resistors 44 and 48, as well as the values of the capacitors 30, may be externally controlled. Hence, the equalizer is easily tunable by changing the size of the resistance (Gm) producing devices 28, or by adjusting the gate voltage via a control signal, described below.

Figure 7:
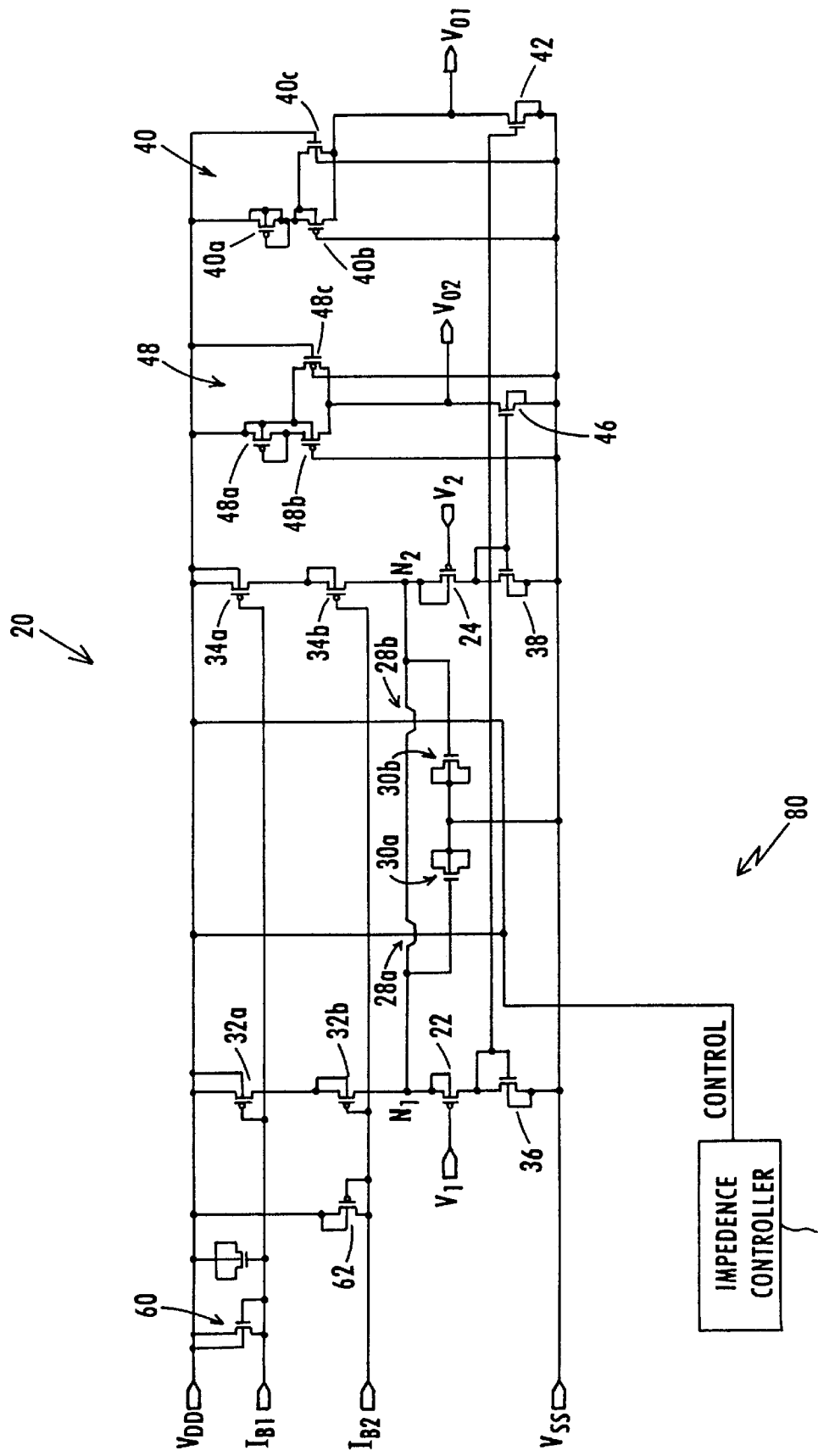
FIG. 7 is an exemplary circuit implementation of the single zero filters of FIGS. 6A and 6B.

FIG. 7 is a circuit diagram illustrating an exemplary implementation of a network line the single zero high-pass filter 20 of FIG. 7 according to an embodiment of the present invention. As shown in FIG. 7, the resistor 28 is implemented as MOS transistors 28a and 28b. The resistors 28a and 28b are PMOS devices, such that one can easily change the characteristics of the high-pass filter by changing the resistor value, e.g. changing the size of the MOS device. For example, this single zero high-pass filter 20 may include a plurality of devices 28a, 28b, etc., in parallel, and may be either disabled or enabled by separate enable inputs to the corresponding gate. Alternately, the gate voltage of the devices 28a and 28b may be changed, which changes the effective resistance. In particular, the equalizer 80 includes an impedance controller 100 for outputting a control signal (CONTROL) that selects (i.e., adjusts) the impedance of the filter 20. Hence, the control signal (CONTROL) may be implemented as a single common path to each of the resistors that has a predetermined voltage corresponding to a desired resistance, or alternately as a plurality of enable inputs supplied to respective resistance devices.

As shown in FIG. 7, bias current ($I_{B1}$ and $I_{B2}$) is supplied to transistors 32a, 32b, 34a and 34b for generating a bias current to nodes $N_1$ and $N_2$, respectively. Specifically, current flows into transistors 60 and 62, which is reflected into the MOS transistor pair 32a and 32b, and the pair of transistors 34a and 34b. The pair of transistors 32a and 32b output the bias current to node $N_1$ and transistors 34a and 34b output the bias current to node $N_2$. The MOS transistors 22 and 24 output differential currents having a difference corresponding to the impedance of MOS transistors 28 and 30, and the differential input signals $V_1$ and $V_2$.

The current mirror transistor 36 has a match, namely MOS transistor 42, that attempts to mirror the current of MOS transistor 36. Similarly, current mirror transistor 38 is matched by MOS transistor 46. Hence, the current in MOS transistor 36 will be reproduced in MOS transistor 42, and the current in MOS transistor 38 will be reproduced in MOS transistor 46. The current in MOS transistor 42 is dropped across load transistors 40a, 40b, and 40c, converting the current to the output voltage $V_{O1}$. Similarly, the current in MOS transistor 46 is dropped across load transistors 48a, 48b, and 48c, producing a voltage drop that converts the current to output voltage $V_{O2}$. The use of MOS transistors in implementing the resistors 40 and 48 provide a better impedance matching with subsequent CMOS-based devices receiving the output signals. In addition, the resistance values can be easily changed, either by changing the size of the MOS devices or alternately by individually controlling each of the MOS devices 40a, 40b, 40c, 48a, 48b and 48c.

Figure 8A:
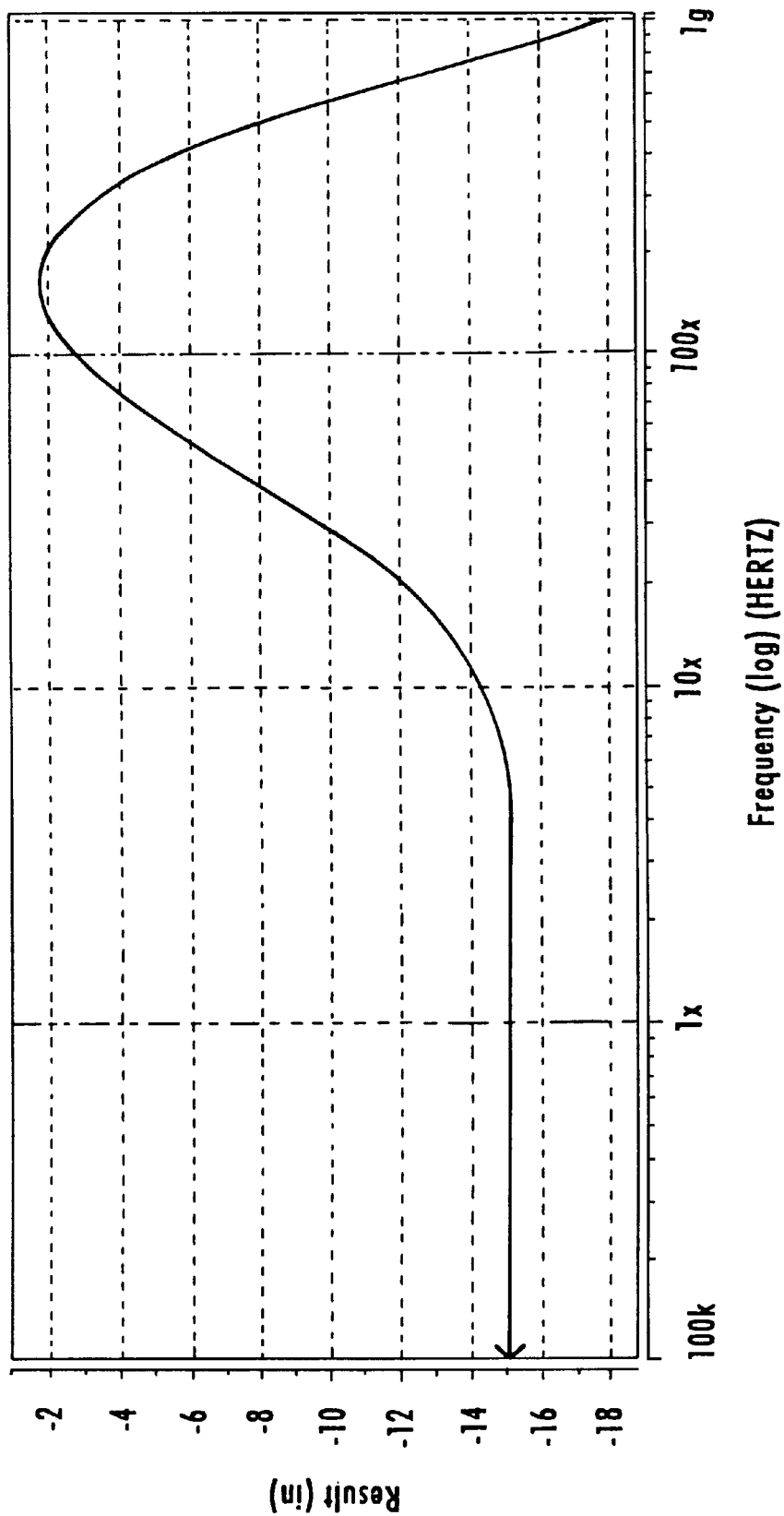
FIGS. 8A and 8B are gain and phase plots for the single zero filter of FIG. 7, respectively.
Figure 8B:
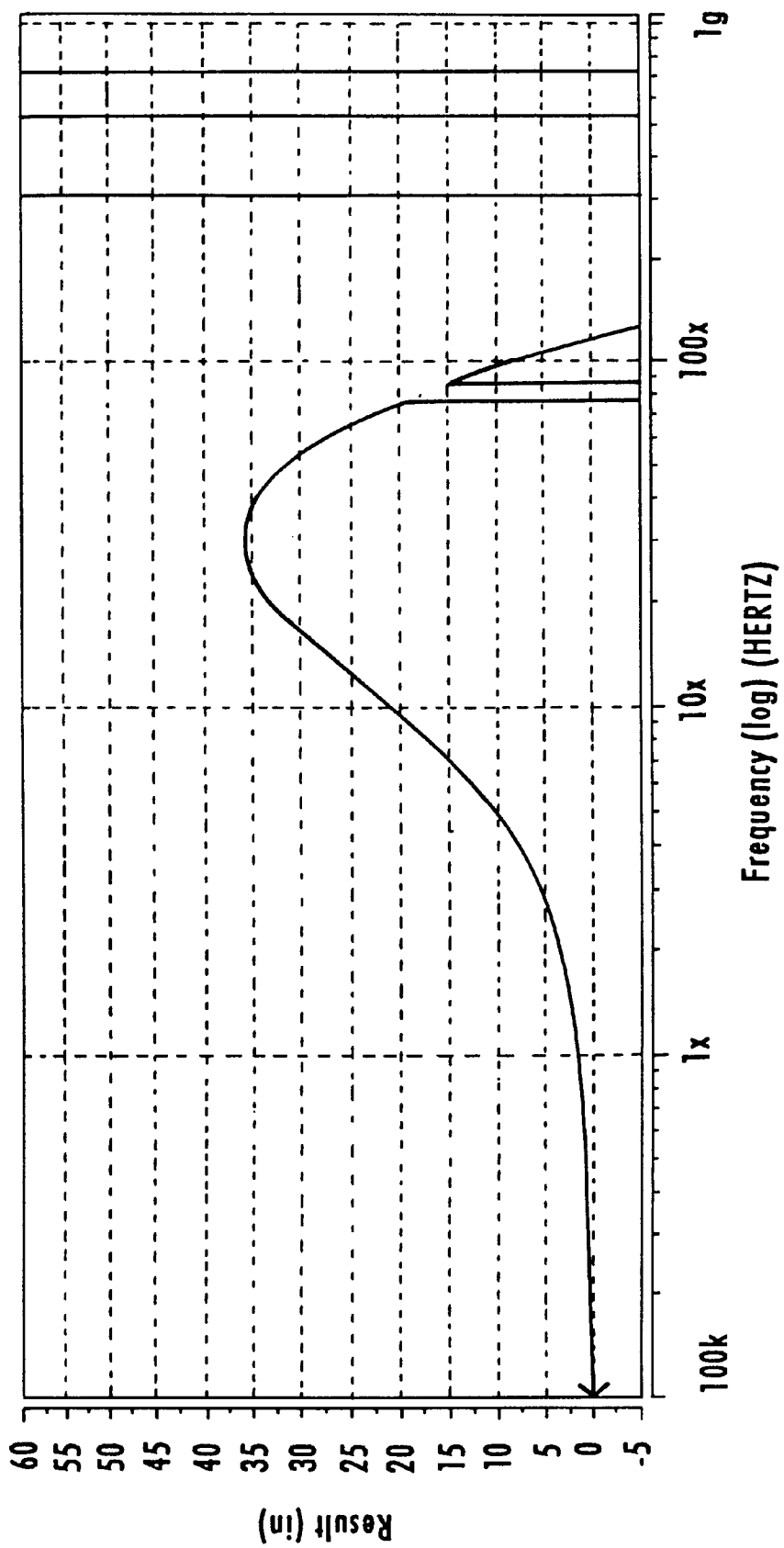

FIGS. 8A and 8B are diagrams illustrating a response of the high-pass filter 20 according to an embodiment of the present invention. As shown in FIG. 8A, the single zero high-pass filter 20 has a zero at about 18 MHz optimized for compensation of attenuated high-frequency components during transmission by a network medium, such as a 100-BASE-TX medium.

Hence, the high pass filter 20 outputs differential filtered signals based on the transfer function $H_A=(S+Z)/(S+P_2)$, where the zero is based on the resistance values (R) of the resistance-providing MOS transistor 28, and the capacitance-providing resistors 30. Depending on the location of high frequency pole $P_2$, the high pass filter 20 can be selectively tuned for operation with the single zero, single pole filter 51, described below.

Figure 9A:
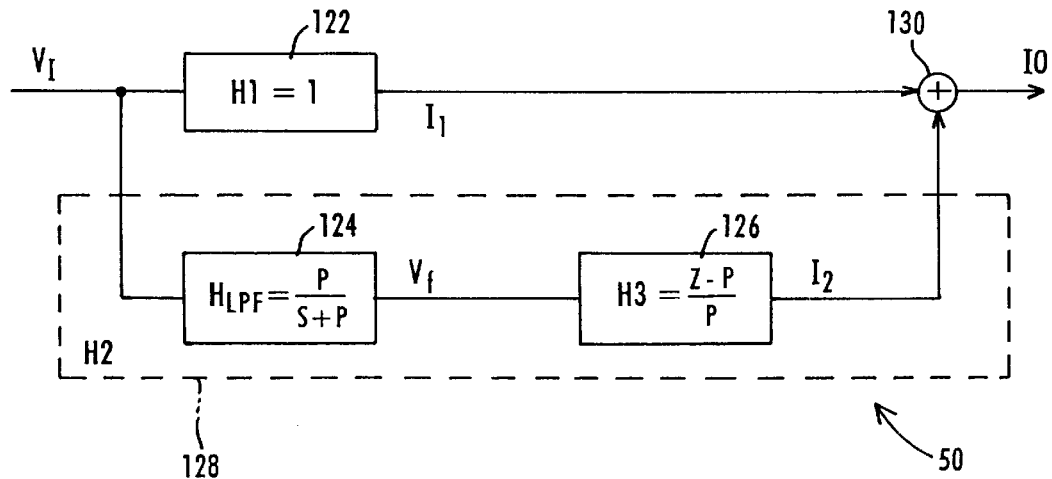
FIGS. 9A and 9B are block diagrams and FIG. 9C is a circuit diagram illustrating an implementation of the single zero, single pole filter of FIG. 5 according to an embodiment of the present invention.

FIG. 9A is a block diagram illustrating a single zero, single pole filter 50 according to an embodiment of the present invention. The filter 50, also referred to as an equalizer, has a single zero and a single pole, i.e., has a transfer function $H_B=(s+z)/(s+p)$, where z is a zero and p is a pole, and where s represents frequency. Partial fraction expansion may be used to obtain the expression $H_B=(s+z)/(s+p)=1+a/(s+p)$, where $a=z-p$.

As shown in FIG. 9A, the filter 50 includes a first element 122 having the unitary response H1=1, a low pass filter 124, and a third element 126. The low pass filter 124 and third element 126 in combination form a unit 128 that is characterized by the transfer function $H2=(z-p)/(s+p)$. The filter 50 also includes an output circuit 130 combining the signals output from the element 122 and the unit 128 to form the output signal IO according to the low pass filter transfer function $H_B=1+(z-p)/(s+p)$.

Figure 9B:
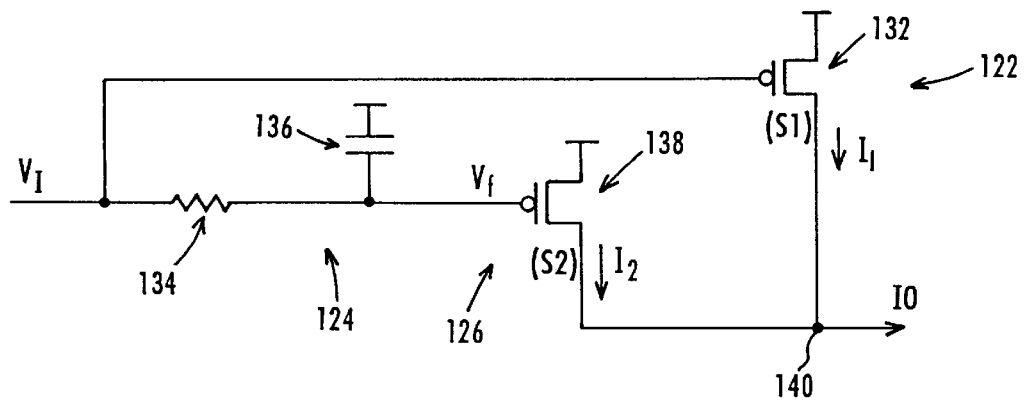

The transfer function $H2=(z-p)/(s+p)$ is analogous to an RC low pass filter. In particular, FIG. 9B is a circuit diagram illustrating a single-input implementation of the filter 50. As shown in FIG. 9B, the element 122 having unitary transfer function H1=1 is implemented by a MOS transistor 132. The MOS transistor 132 has a predetermined size and characteristics to operate as a simple tranconductance amplifier that converts the input voltage $V_I$ to current $I_1$. The low pass filter 124, configured for outputting a filtered voltage signal $V_f$ in response to the input voltage signal $V_I$ includes a resistor element 134 and a capacitor element 136, implemented preferably as MOS transistors. The low pass 124 filter has a transfer function $H_{LPF}=p/(s+p)$, where p=1/RC. Although the voltage addition of the "1" term and the term "p/(s+p)" is complicated, a more simple method involves converting the input voltages $V_I$ and $V_f$ into currents, using the transconductance (Gm) qualities of the MOS devices, and then adding or subtracting the currents.

As described above, the low pass filter 124 has a transfer function $H_{LPF}=p/(s+p)$. However, it is also necessary to execute the entire partial fraction expansion $H=1+a/(s+p)$, where $a=z-p$. Hence, it is necessary to execute the fractional component $a=z-p$, since the value $a=p$ is undesirable. Hence, the unit 126 must be able to convert the expression $p/(s+p)$ into $(z-p)/(s+p)$. As shown in FIG. 9B, the unit 126 includes a MOS transistor 138 that outputs a current $I_2$. If the transistors 132 and 138 are identical in size, then the ratio of currents $I_1$ and $I_2$ would be equal to 1. Hence, the transfer function H3 of the unit 126 composed of the MOS transistor 138 must have a value such that $H_{LPF}H3=(z-p)/(s+p)$. Since $H_{LPF}=p/(s+p)$, then $H3=(z-p)/p$.

Consequently, the transfer function H3 of MOS transistor 138 is implemented by reducing the size of the MOS transistor 138 relative to the size of the MOS transistor 132. Specifically, if the MOS transistor 132 has a first size (S1), then the MOS transistor 138 has a second size as (S2) such that the size of the second transistor is based on the transfer function $H3=(z-p)/p$, such that $S2=S1(z-p)/p$.

Hence, the MOS transistor 138 serves as a transconductance amplifier for the filtered voltage signal $V_f$, and reduces the current relative to MOS transistor 132 by an amount $(z-p)/p$.

Hence, the present invention enables formation of a single zero, single pole filter 50 using MOS transistors without the necessity of operational amplifier or switched capacitor filters. The selection of the size for the MOS transistor 138 relative to the MOS transistor 132 provides a high speed operation due to a direct and simple conversion of input voltages ($V_I$) into operating current $I_1$ and $I_2$. The currents $I_1$ and $I_2$ are combined at node 140, corresponding to the element 130, that provides an output signal equalized in accordance with the zero and the pole. The circuit of FIG. 9B is particularly effective if the pole is a lower frequency than the zero.

If the zero "z" is at a lower frequency than the pole "p" then the quantity "z-p" is negative, requiring a current subtraction. Current subtraction can be accomplished in a differential input equalizer that receives differential inputs. In particular, current subtraction is accomplished by adding the current produced by the low pass filter 124 of the negative differential input (VN) to the current produced by the positive voltage input (VP).

Figure 9C:
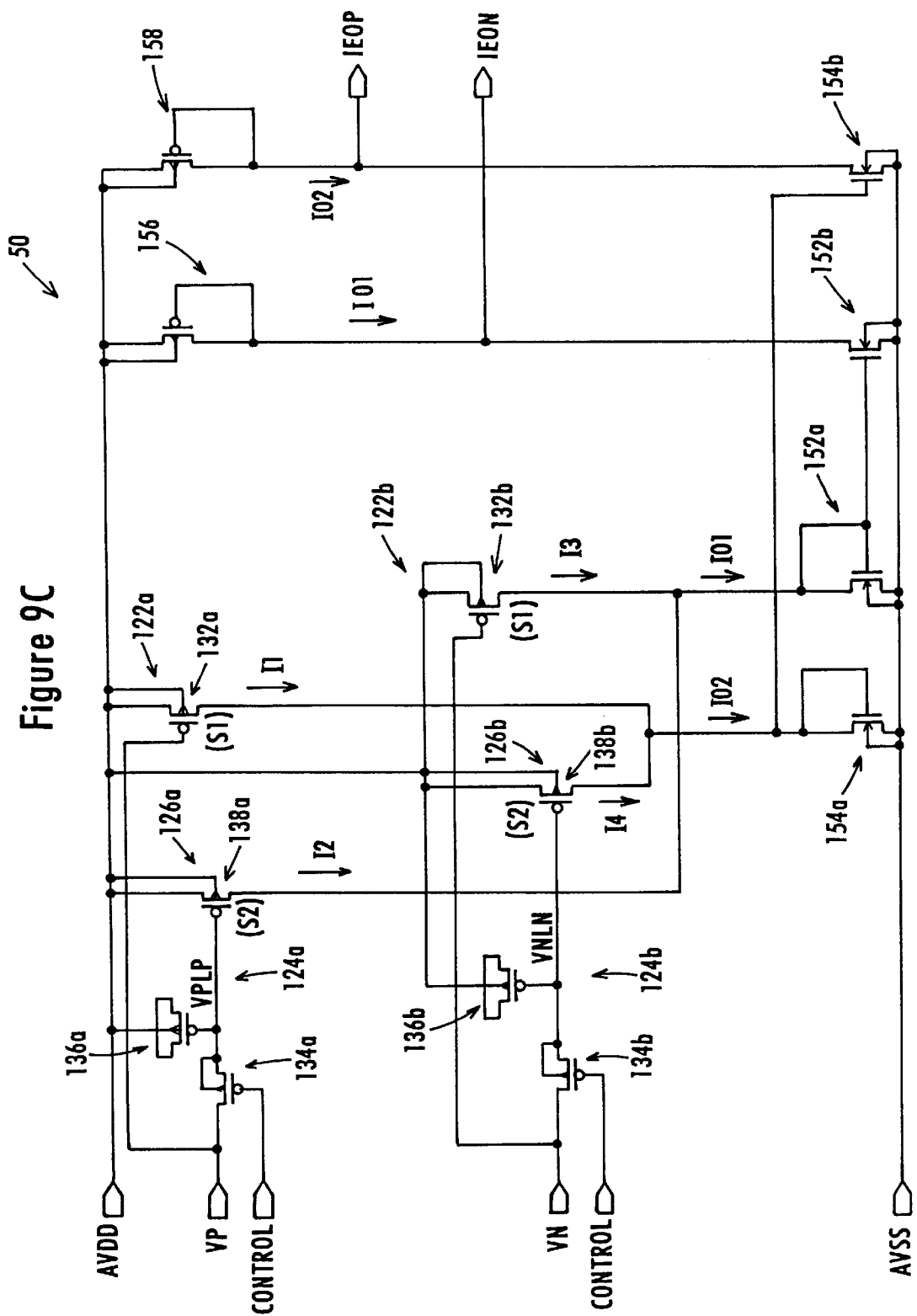

FIG. 9C is a circuit diagram demonstrating a differential single zero and single pole filter 50 according to the embodiment of the present invention. As shown in FIG. 9C, the filter 50 includes transconductance amplifiers 122a and 122b implemented as MOS transistors 132a and 132b, respectively. Each MOS transistor 132a and 132b has a first predetermined size (S1) for converting the corresponding differential filtered voltage signal received from the high pass filter 20 into a current. As shown in FIG. 9C, the MOS transistor 132a has a gate for receiving the input voltage signal VP, and response outputs a current signal $I_1$. The MOS transistor 132b similarly outputs a current signal $I_3$ in response to receiving the differential input voltage signal VN at the MOS transistor gate. As recognized in the art, the differential input voltage signal VN has an inverse polarity relative to the first differential signal VP. Hence, the current signals $I_1$ and $I_3$ are substantially equal and have opposite polarity such that $I_1=-I_3$.

The filter 50 also includes low pass filters 124a and 124b, each comprising a MOS transistor 134 that provides the prescribed resistance R, and a MOS transistor 136 coupled to the resistor 134 and providing the prescribed capacitance. As shown in FIG. 9C, each of the MOS transistors 134a and 134b have a control signal (CONTROL) supplied to the gate, enabling the corresponding MOS transistor 134 to provide the prescribed resistance based on the control signal. In addition, the control signal may be varied enabling the MOS transistor 134a or 134b to change the corresponding resistance based on the control signal. Hence, the frequency response of the low pass filter 124a and 124b may be tuned by independent adjustment of the control signals to MOS transistors 134a and 134b.

The low pass filters 124a and 124b output filtered voltage signals VPLP and VNLN in response to the input differential voltage signals VP and VN, respectively. As described above, each of the low pass filters 124 have a transfer function $H_{LPF}=p/(s+p)$. The filtered voltage signals VPLP and VNLN are supplied to transconductance amplifiers 126a and 126b, implemented as MOS transistors 138a and 138b, respectively.

As described above, each of the MOS transistors 138a and 138b has a second size (S2) relative to the first size (S1) of the MOS transistors 132a and 132b, such that $S2=S1(z-p)/p$. Since the frequency response characteristics of low pass filters 124a and 124b are essentially the same, the voltages VPLP and VNLN are substantially equal but of opposite polarity such that VPLP=-VNLN. The MOS transistor 138a outputs a current signal $I_2$ according to the function $VPLP(z-p)/p=VP(z-p)/(s+p)$. The MOS transistor 138b also outputs a current signal $I_4$ according to the function $VN(z-p)/(s+p)$.

The filter of FIG. 9C assumes that the zero is at a lower frequency than the pole. Hence, since $I_1=-I_3$, current subtraction is performed by adding the first current signal $I_1$ and the fourth current signal $I_4$, such that IO2 equals $I_1+I_4$ and IO1 equals $I_2+I_3$. The first differential output signal IO1 and the second differential output signal IO2 provide a differential current output for the filter 50 in accordance with the zero and the pole.

As shown in FIG. 9C, the filter 50 also includes a first set of current mirrors 152a and 152b for outputting the first differential output signal IO1 and a second set of current mirrors 154a and 154b for outputting the second differential output signal IO2. As shown in FIG. 9C, the filter 50 also includes load transistors 156 and 158 for converting the differential current signal IO1 and IO2 into output voltage signals IEON and IEOP, respectively.

Figure 10A:
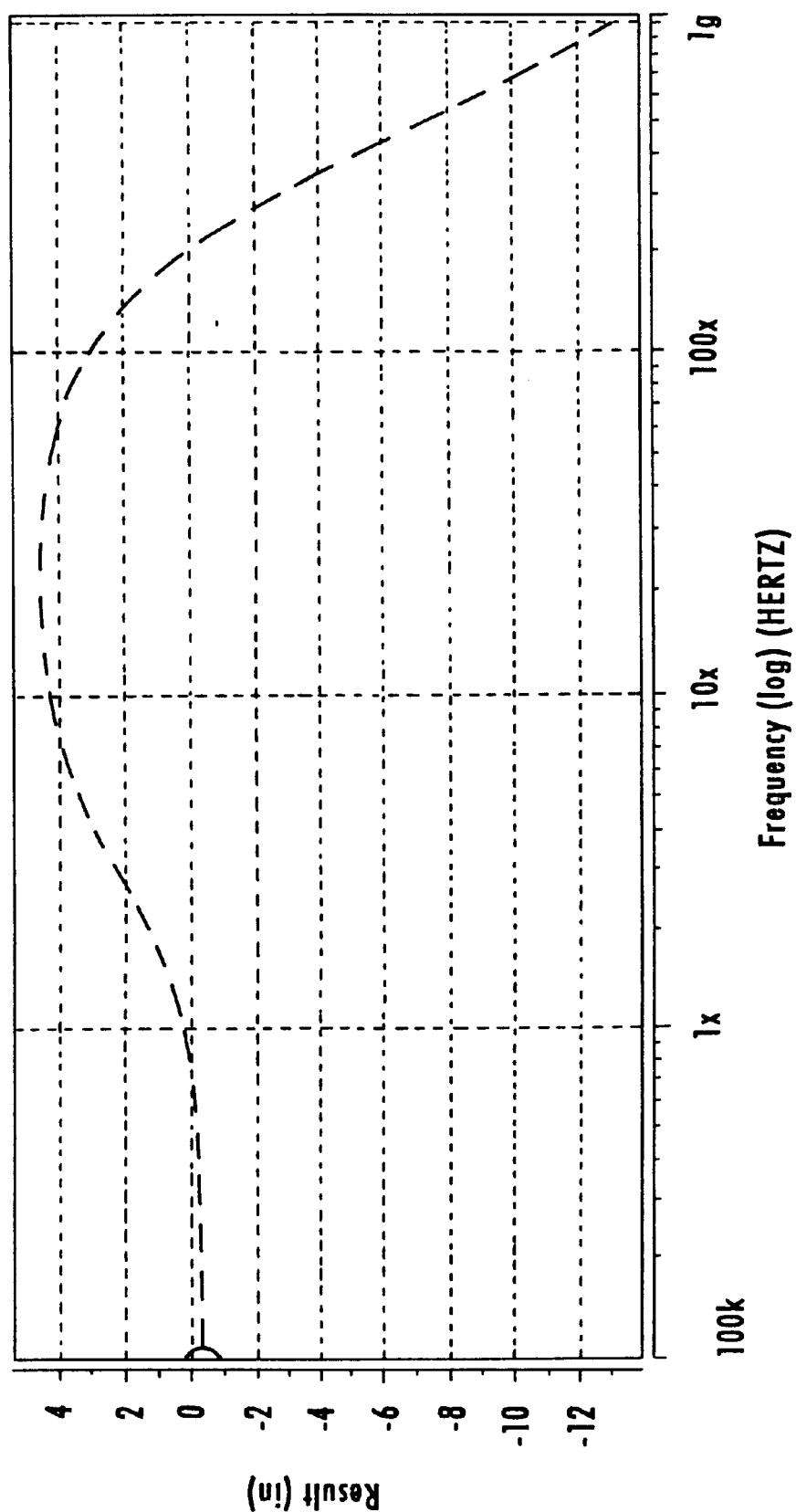
FIGS. 10A and 10B are gain and phase plots for the filter of FIGS. 9A, 9B and 9C.
Figure 10B:
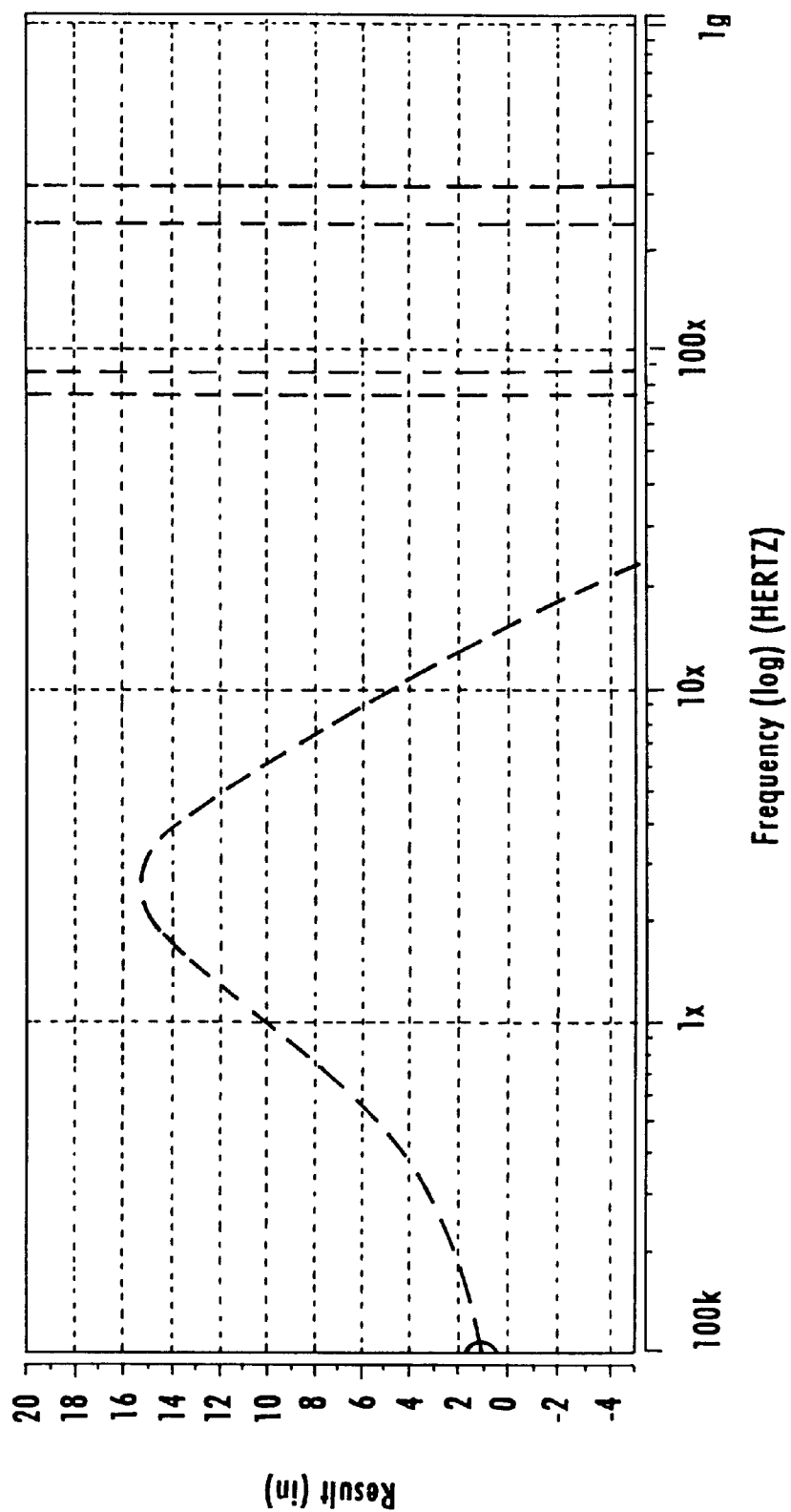

FIGS. 10A and 10B are diagrams illustrating a response of the filter 50 according to an embodiment of the present invention. FIG. 10A is a gain plot, and FIG. 10B is a phase plot. As shown in FIG. 6A, the filter is optimized for compensation of attenuated high frequency components during transmission by a network medium, such as 100 Base TX medium, while also correcting for lower frequencies.

According to the disclosed embodiment, a biquadratic equalizer is implemented without the necessity of feedback loops or operational amplifiers. Rather, the disclosed embodiment provides a high-speed operation due to a direct and simple conversion of input voltage (VP-VN) into operating current using MOS transistors 132 and 138. In addition, the filter may be operated in a current mode or a voltage mode as desired. In current mode the current of the MOS transistors 152a and 154a may be output to a following amplifier stage. In voltage mode, the current IO1 and IO2 is dropped across resistance producing devices 156 and 158 in order to generate the output voltages IEON and IEOP.

Hence, the system of FIG. 5 has a relatively small size. In particular, the filter 20 may be a single zero filter having a high frequency parasitic pole ($P_2$). Hence, the single zero, single pole filter 50 may be connected in series in a single zero filter 60 having a parasitic pole $P_2$ to form a biquadratic equalizer 80. The elimination of feedback loops eliminates any stability issues that are normally encountered in feedback-based systems. In particular, feedback amplifier system suffer from oscillation and ringing at certain frequencies, requiring efforts to ensure amplifier stability. Use of transconductance-controlled MOS transistors to form the above-described filters, however, eliminates the necessity of a feedback loop, substantially improving stability.

Although this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A biquadratic equalizer, comprising:
   a single zero high pass filter comprising first and second metal oxide semiconductor (MOS) transistors, each having first and second junctions and a gate for receiving a corresponding differential input signal, the single zero high pass filter further comprising a single zero impedance circuit connecting the first and second MOS transistors at the corresponding first junctions, the second junctions of the first and second MOS transistors outputting respective differential filtered signals based on the impedance, the differential input signals, and a parasitic pole caused by the first and second MOS transistors; and
   a single zero, single pole low pass filter comprising:
   (1) third and fourth MOS transistors, each having a gate for receiving a corresponding one of the differential filtered signals, for outputting first and second current signals, respectively,
   (2) first and second low pass filters, each having a pole defined by a prescribed resistance and capacitance, for outputting first and second filtered signals based on the pole and in response to the corresponding one of the differential filtered signals, respectively, and
   (3) fifth and sixth MOS transistors having gates for receiving the first and second filtered signals and in response, outputting third and fourth current signals, respectively, the first, second, third and fourth current signals in combination providing a differential output signal equalized in accordance with a prescribed biquadratic function.

2. The equalizer of claim 1, wherein the first and second low pass filters each comprise:
   a resistance-providing MOS transistor providing the prescribed resistance; and a capacitance-providing MOS transistor coupled to the resistance-providing MOS transistor and providing the prescribed capacitance.

3. A biquadratic equalizer, comprising:

a first filter comprising first and second metal oxide semiconductor (MOS) transistors, each having first and second junctions and a gate for receiving a corresponding differential input signal, the first filter further comprising a single zero impedance circuit connecting the first and second MOS transistors at the corresponding first junctions, the second junctions of the first and second MOS transistors outputting respective differential filtered signals based on the impedance, the differential input signals, and a parasitic pole caused by the first and second MOS transistors; and a single zero, single pole filter comprising:
(1) third and fourth MOS transistors, each having a gate for receiving a corresponding one of the differential filtered signals, for outputting first and second current signals, respectively,
(2) first and second low pass filters, each having a pole defined by a prescribed resistance and capacitance, for outputting first and second filtered signals based on the pole and in response to the corresponding one of the differential filtered signals,
(3) fifth and sixth MOS transistors having gates for receiving the first and second filtered signals and in response outputting third and fourth current signals, respectively, the first, second, third and fourth current signals in combination providing a differential output signal equalized in accordance with a prescribed biquadratic function;

a first set of current mirrors for outputting a sum of the first current signal and the fourth current signal as a first differential output signal of the filtered differential output signal; and a second set of current mirrors for outputting a sum of the second current signal and the third current signal as a second differential output of the filtered differential output signal, wherein the first and second low pass filters each comprise:
a resistance-providing MOS transistor providing the prescribed resistance; and
a capacitance-providing MOS transistor coupled to the resistance-providing MOS transistor and providing the prescribed capacitance.

4. The equalizer of claim 3, wherein the resistance-providing MOS transistor has a gate for receiving a control signal, the resistance-providing MOS transistor providing the prescribed resistance based on the control signal.

5. The equalizer of claim 1, wherein the third and fourth MOS transistors each have a first size, and the fifth and sixth MOS transistors each have a second size relative to the first size by a prescribed relation between the pole and a zero of the first and second low pass filters.

6. The equalizer of claim 5, wherein the prescribed relation is $p/(z-p)$, wherein p is the pole and z is the zero, and wherein the second size (S2) equals the first size (S1) reduced by a factor of the prescribed relation $(S2=S1(z-p)/p)$.

7. The equalizer of claim 6, wherein the first and second low pass filters each output the corresponding filtered signal in response to the corresponding one of the differential filtered signals and according to a first transfer function $H1=p/(s+p)$.

8. The equalizer of claim 7, wherein the fifth and sizth MOS transistors output the respective third and fourth current signals according to a second transfer function $H2=(z-p)/(s+p)$ relative to the respective first and second filtered signals.

9. The equalizer of claim 8, wherein the single zero, single pole filter provides the differential output signal according to a third transfer function $H3=1+(z-p)/(s+p)$.

10. The equalizer of claim 1, wherein the single zero inpedance circuit comprises:
at least one MOS transistor configured for supplying a prescribed capacitance between the first junctions of the first and second MOS transistors; and
seventh and eighth MOS transistors configured for supplying a selected resistance between the first junctions.

11. The equalizer of claim 10, wherein the seventh and eighth MOS transistors supply the selected resistance based on the respective sizes.

12. The equalizer of claim 11, wherein the seventh and eighth MOS transistors supply the selected resistance based on the respective sizes and in response to a control signal supplied to the gates of the seventh and eighth MOS transistors.

13. A biquadratic equalizer, comprising:

a single zero high pass filter comprising first and second metal oxide semiconductor (MOS) transistors, each having a gate for receiving a corresponding differential input signal, and a single zero impedance circuit having a selectable impedance and connecting the first and second MOS transistors, the first and second MOS transistors outputting respective differential filtered signals based on the single zero impedance circuit and a parasitic pole induced by the first and second MOS transistors; and a single zero, single pole low pass filter comprising:
(1) third and fourth MOS transistors having a first size and for outputting first and second current signals in response to the respective differential filtered signals,
(2) first and second low pass filters outputting first and second filtered voltage signals in response to the respective differential filtered signals, respectively, based on a pole defined by a prescribed resistance and a prescribed capacitance, and
(3) fifth and sixth MOS transistors having gates for receiving a corresponding one of the first and second filtered voltage signals and outputting respective third and fourth current signals, each of the fifth and sixth MOS transistors having a second size relative to the first size by a prescribed relation between the pole and the zero, the first, second, third and fourth current signals in combination providing a differential equalized output signal.

14. The equalizer of claim 13, wherein the low pass filters each comprise:
a resistance-providing MOS transistor providing the prescribed resistance; and
a capacitance-providing MOS transistor coupled to the resistance-providing MOS transistor and providing the prescribed capacitance.

15. The equalizer of claim 14, wherein the resistance-providing MOS transistor has a gate for receiving a control signal, the resistance-providing MOS transistor providing the prescribed resistance based on the control signal.

16. A biquadratic equalizer comprising:
a high pass filter comprising first and second metal oxide semiconductor (MOS) transistors, each having a gate for receiving a corresponding differential input signal, and a single zero impedance circuit having a selectable impedance and connecting the first and second MOS transistors, the first and second MOS transistors outputting respective differential filtered signals based on the single zero impedance circuit and a parasitic pole induced by the first and second MOS transistors;

a single zero, single pole filter comprising:
(1) third and fourth MOS transistors having a first size and for outputting first and second current signals in response to the respective differential filtered signals,
(2) first and second low pass filters outputting first and second filtered voltage signals in response to the differential input voltage signals, respectively, based on a pole defined by a prescribed resistance and a prescribed capacitance, and
(3) fifth and sixth MOS transistors, each having a second size relative to the first size by a prescribed relation between the pole and a zero of the single zero, single pole filter, for outputting third and fourth current signals in response to the first and second filtered voltage signals, respectively, the first, second, third and fourth current signals in combination providing a differential equalized output signal; and an output circuit having:
a first set of current mirrors for outputting a sum of the first current signal and the fourth current signal as a first differential output signal of the differential equalized output signal; and
a second of current mirrors for outputting a sum of the second current signal and the third current signal as a second differential output signal of the differential equalized output signal.

17. The equalizer of claim 13, wherein the prescribed relation is $p/(z-p)$, wherein p is the pole and z is the zero, and wherein the second size (S2) equals the first size (S1) reduced by a factor of the prescribed relation ($S2=S1(z-p)/p$).

18. The equalizer of claim 17, wherein each low pass filter outputs the corresponding filtered voltage signal in response to the corresponding differential input voltage signal and according to a first transfer function $H1=p/(s+p)$.

19. The equalizer of claim 18, wherein the fifth and sixth MOS transistors each outputs the corresponding current signal according to a second transfer function $H2=(z-p)/(s+p)$ relative to the corresponding differential filtered signal.

20. A method of equalizing an input signal, the method comprising:

filtering an input voltage signal in a high pass filter, having transconductance-controlled metal oxide semiconductor (MOS) transistors generating a single zero and a parasitic pole, and outputting a filtered input voltage signal;
first, outputting a first current signal from a first MOS transistor in response to receiving the filtered input voltage signal at a corresponding gate, the first MOS transistor having a first size;
second, outputting a filtered voltage signal from a low pass filter in response to receiving the filtered input voltage signal, the low pass filter having a pole defined by a prescribed resistance and a prescribed capacitance;
third, outputting a second current signal from a second MOS transistor in response to receiving the filtered voltage signal at a gate of the second MOS transistor, the second MOS transistor having a second size relative to the first size by a prescribed relation between the pole and a transfer function zero; and
combining the first and second current signals to obtain a filtered signal.

21. The method of claim 20, wherein the low pass filter comprises a third MOS transistor for providing the prescribed resistance and a fourth MOS transistor coupled to the third MOS transistor for providing the prescribed capacitance, the method further comprising supplying a control signal to the third MOS transistor to control the prescribed resistance.

22. The method of claim 20, wherein the prescribed relation is $p/(z-p)$, wherein p is the pole and z is the zero, and wherein the second size (S2) equals the first size (S1) reduced by a factor of the prescribed relation ($S2=S1(z-p)/p$).

23. The filter of claim 22, wherein the second outputting step includes outputting the filtered voltage signal in response to the input voltage signal and according to a first transfer function $H1=p/(s+p)$.

24. The filter of claim 23, wherein the third outputting step includes outputting the second current signal according to a second transfer function $H2=(z-p)/(s+p)$ relative to the input voltage signal.

25. The filter of claim 24, wherein the combining step includes generating the filtered signal according to a third transfer function $H3=1+(z-p)/(s+p)$ relative to the input voltage signal.

* * * * *